United States Patent
Hatano et al.

(10) Patent No.: US 11,936,432 B2
(45) Date of Patent: Mar. 19, 2024

(54) COMMUNICATION SYSTEM AND OLT SYSTEM

(71) Applicant: NIPPON TELEGRAPH AND TELEPHONE CORPORATION, Tokyo (JP)

(72) Inventors: Tomoya Hatano, Musashino (JP); Keita Takahashi, Musashino (JP); Naotaka Shibata, Musashino (JP); Hiroko Nomura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/907,948

(22) PCT Filed: Mar. 6, 2020

(86) PCT No.: PCT/JP2020/009725
§ 371 (c)(1),
(2) Date: Aug. 29, 2022

(87) PCT Pub. No.: WO2021/176694
PCT Pub. Date: Sep. 10, 2021

(65) Prior Publication Data
US 2023/0146851 A1    May 11, 2023

(51) Int. Cl.
*H04B 10/03* (2013.01)
*H04B 10/275* (2013.01)
(Continued)

(52) U.S. Cl.
CPC ........... *H04B 10/614* (2013.01); *H04B 10/03* (2013.01); *H04B 10/275* (2013.01);
(Continued)

(58) Field of Classification Search
CPC .... H04B 10/614; H04B 10/03; H04B 10/275; H04B 10/032; H04B 10/07;
(Continued)

(56) References Cited

U.S. PATENT DOCUMENTS 5,058,101 A * 10/1991 Albanese ............. H04B 10/271
398/1
5,886,801 A *  3/1999 Van Deventer ........ H04B 10/27
398/1
(Continued)

FOREIGN PATENT DOCUMENTS

| JP | 2001136188 A | 5/2001 |
| JP | 2001168802 A | 6/2001 |

(Continued)

OTHER PUBLICATIONS

Kim et al., KR20130017821A, Feb. 2013, All Document. (Year: 2013).*

(Continued)

*Primary Examiner* — Dibson J Sanchez
(74) *Attorney, Agent, or Firm* — Harness, Dickey & Pierce, P.L.C.

(57) ABSTRACT

A communication system of a passive optical communication network includes an optical line terminal (OLT) system including a first OLT, a second OLT, and an OLT control device that controls the first OLT and the second OLT, a plurality of splitters that connect the first OLT and the second OLT with an optical communication path, and an ONU that is connected to each of the splitters with an optical communication path. The splitter distributes and outputs an optical signal transmitted from the OLT system to the ONU connected to the splitter and a succeeding device that is another splitter or the OLT system, and the OLT control device determines a distribution ratio at the splitter, the distribution ratio indicating a ratio between the intensity of (Continued)

the optical signal distributed to the succeeding device and the intensity of the optical signal distributed to the ONU.

10 Claims, 8 Drawing Sheets

(51) Int. Cl.
*H04B 10/61* (2013.01)
*H04B 10/032* (2013.01)
*H04B 10/07* (2013.01)
*H04B 10/079* (2013.01)
*H04J 14/02* (2006.01)
*H04Q 11/00* (2006.01)

(52) U.S. Cl.
CPC ............ *H04B 10/032* (2013.01); *H04B 10/07* (2013.01); *H04B 10/07955* (2013.01); *H04J 14/0287* (2013.01); *H04J 14/0293* (2013.01); *H04Q 2011/0081* (2013.01); *H04Q 2011/0083* (2013.01)

(58) Field of Classification Search
CPC ............ H04B 10/07955; H04B 10/272; H04J 14/0287; H04J 14/0293; H04Q 2011/0081; H04Q 2011/0083
USPC .......................................... 398/1–38, 43–103
See application file for complete search history.

(56) References Cited

U.S. PATENT DOCUMENTS

| | | | | |
|---|---|---|---|---|
| 6,327,400 B1* | 12/2001 | Harstead | .............. | H04B 10/275 385/16 |
| 6,351,582 B1* | 2/2002 | Dyke | .................. | H04B 10/272 385/24 |
| 6,414,768 B1* | 7/2002 | Sakata | .................. | H04B 10/27 398/59 |
| 6,681,083 B1 | 1/2004 | Koonen | | |
| 7,272,321 B1* | 9/2007 | Kuo | .................... | H04J 14/0241 398/100 |
| 2003/0067643 A1* | 4/2003 | Lee | ..................... | H04J 14/0295 398/42 |
| 2005/0019031 A1 | 1/2005 | Ye et al. | | |
| 2005/0175343 A1* | 8/2005 | Huang | .................. | H04J 14/025 398/66 |
| 2009/0052893 A1* | 2/2009 | Beer | .................... | H04J 14/0283 398/48 |
| 2009/0074403 A1* | 3/2009 | Chi | ........................ | H04B 10/275 398/3 |
| 2009/0129770 A1 | 5/2009 | Oohashi et al. | | |
| 2010/0189442 A1* | 7/2010 | Grobe | ................. | H04J 14/0283 398/79 |
| 2012/0207473 A1* | 8/2012 | Smolorz | ............ | H04B 10/2581 398/59 |
| 2012/0328293 A1* | 12/2012 | Grobe | .................. | H04B 10/272 398/58 |
| 2013/0071104 A1 | 3/2013 | Nakashima et al. | | |
| 2014/0226966 A1* | 8/2014 | Lutgen | ................. | H04B 10/032 398/5 |
| 2016/0105240 A1* | 4/2016 | Yang | ..................... | G02B 6/2938 398/68 |
| 2016/0112136 A1* | 4/2016 | Urban | .................... | H04B 10/27 398/66 |
| 2017/0272160 A1* | 9/2017 | Xu | .......................... | H04J 14/02 |
| 2021/0103099 A1* | 4/2021 | Butler | .................... | G02F 1/0115 |
| 2021/0258077 A1* | 8/2021 | Watté | ................... | G02B 6/3508 |

FOREIGN PATENT DOCUMENTS

| | | |
|---|---|---|
| JP | 2009130505 A | 6/2009 |
| JP | 2013070123 A | 4/2013 |

OTHER PUBLICATIONS

Basic Technology Course GE-PON Technology, 1st What is PON?, NTT Technical Journal, vol. 17, No. 8, 2005, pp. 71-74, https://www.ntt.co.jp/journal/0508/files/jn200508071.pdf.

* cited by examiner

Fig. 4

| ASSIGNED OLT | DISTRIBUTION RATIO |
|---|---|
| FIRST OLT | 31 : 1 |
| SECOND OLT | 1 : 31 |

Fig. 5

| ASSIGNED OLT | DISTRIBUTION RATIO |
|---|---|
| FIRST OLT | 14 : 18 |
| SECOND OLT | 20 : 12 |

COMMUNICATION SYSTEM AND OLT SYSTEM

CROSS-REFERENCE TO RELATED APPLICATIONS

This application is a 371 U.S. National Phase of International Application No. PCT/JP2020/009725, filed on Mar. 6, 2020. The entire disclosure of the above application is incorporated herein by reference.

TECHNICAL FIELD

The present disclosure relates to a communication system and an OLT system.

BACKGROUND ART

A service that provides optical access can be offered economically by using a passive optical communication network (PON) on which a terminal station device and a plurality of endpoint devices are connected (for example, see NPL 1). A PON is a point-to-multipoint network on which a station provides a service to multiple subscribers. For example, on a PON, a downlink optical signal from a station is split by an optical coupler linked to a single main fiber and distributed to multiple subscribers. An optical network unit (ONU) on the lower side and an optical line terminal (OLT) on the upper side are used on the PON.

CITATION LIST

Non Patent Literature

NPL 1: "Basic Technical Course GE-OPON Technology", [online], NTT Technical Journal, August 2005, p. 71 to 74, [retrieved on Feb. 28, 2020], Internet URL: https://www.ntt.cojp/journal/0508/files/jn200508071.pdf.

SUMMARY OF THE INVENTION

Technical Problem

However, PONs of the related art has difficulty to maintain communication when a failure such as a facility failure occurs.
In view of the above circumstance, it is an object of the present disclosure to provide a technology that enables to increase the likelihood of maintaining communication even when a failure occurs in a PON.

Means for Solving the Problem

An aspect of the present disclosure is a communication system of a passive optical communication network. The communication system includes an optical line terminal (OLT) system including a first OLT, a second OLT, and an OLT control device that controls the first OLT and the second OLT, a plurality of splitters that connect the first OLT and the second OLT with an optical communication path, and an optical network unit (ONU) that is connected to each of the splitters with an optical communication path. The splitter distributes and outputs an optical signal transmitted from the OLT system to the ONU connected to the splitter and a succeeding device that is another splitter or the OLT system, and the OLT control device determines a distribution ratio at the splitter, the distribution ratio indicating a ratio between an intensity of the optical signal distributed to the succeeding device and an intensity of the optical signal distributed to the ONU.

An aspect of the present disclosure is an optical line terminal (OLT) system of a passive optical communication network. The OLT system includes a first OLT, a second OLT, and an OLT control device that controls the first OLT and the second OLT. The first OLT and the second OLT are connected with a plurality of splitters and an optical communication path, each of the splitters distributes and outputs an optical signal transmitted from the first OLT or the second OLT to the ONU connected to the splitter and a succeeding device, and the OLT control device determines a distribution ratio at the splitter, the distribution ratio indicating a ratio between an intensity of the optical signal distributed to the succeeding device and an intensity of the optical signal distributed to the ONU.

Effects of the Invention

The present disclosure makes it possible to increase the likelihood of maintaining communication even when a failure occurs in a PON.

BRIEF DESCRIPTION OF DRAWINGS

FIG. 4 is a diagram showing a first specific example in a distribution ratio table.
FIG. 5 is a diagram showing a second specific example in the distribution ratio table.

DESCRIPTION OF EMBODIMENTS

Figure 1:
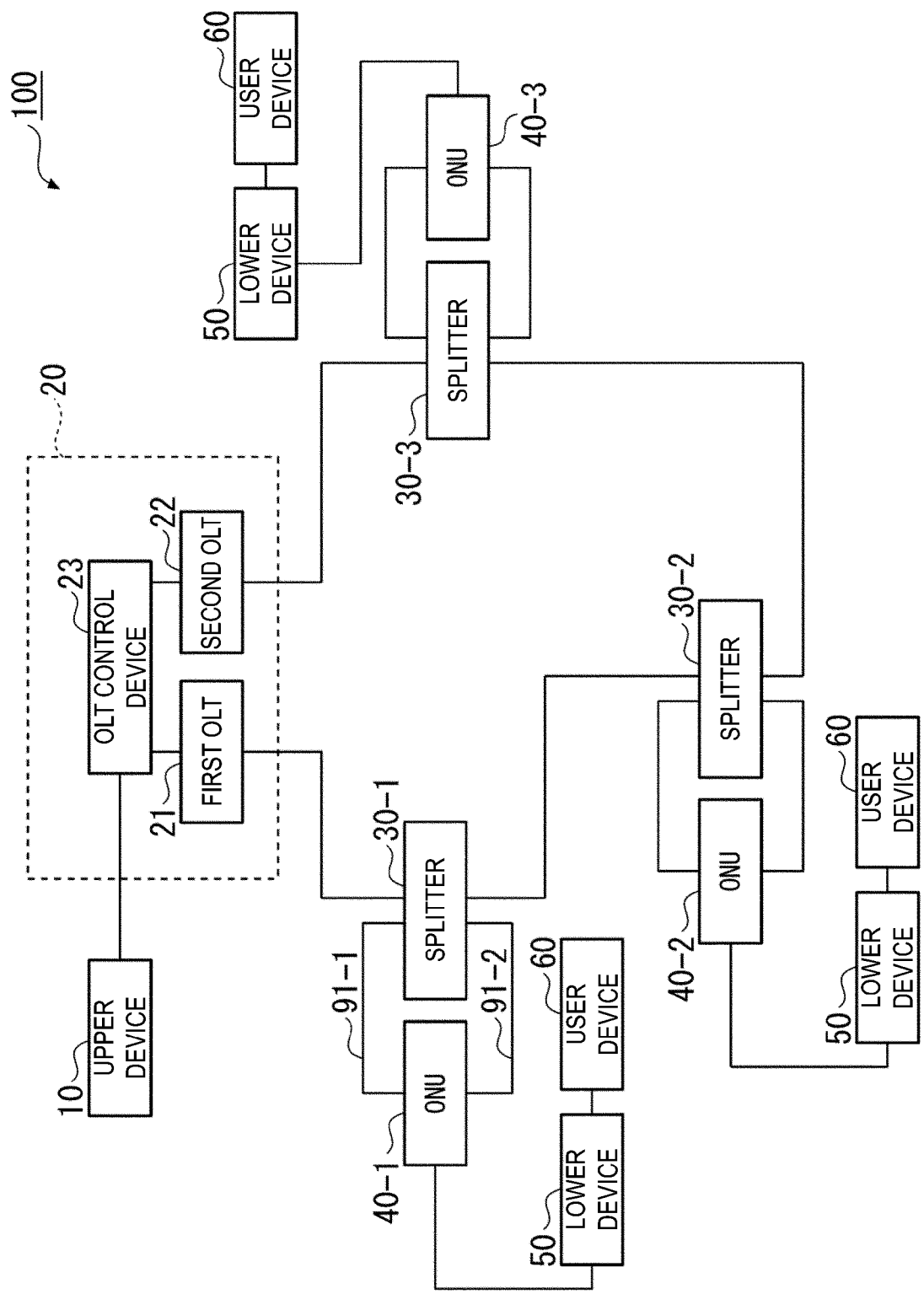
FIG. 1 is a diagram illustrating an exemplary system configuration of a communication system 100 according to the present disclosure.

Embodiments of the present disclosure will be described in detail with reference to the drawings.
FIG. 1 is a diagram illustrating an exemplary system configuration of a communication system 100 according to the present disclosure. The communication system 100 includes an upper device 10, an OLT system 20, a plurality of splitters 30, a plurality of ONUs 40, a lower device 50, and a user device 60. The upper device 10 is connected to an upper network of the communication system 100. Although three splitters 30 and three ONUs 40 are provided in FIG. 1, this number "three" is merely a specific example. That is, at least two splitters 30 and at least two ONUs 40 are required to be provided.

The OLT system 20 is provided so as to communicate with the upper device 10. The OLT system 20 functions as an OLT on a PON. The splitters 30 receive an input of optical signals and output an optical signal to a plurality of paths. The splitters 30 may be formed with, for example, two-input two-output optical splitters.

Each of the ONUs 40 is communicatively connected to the lower device 50. Each of the lower devices 50 is communicatively connected to one or a plurality of user devices 60. Each of the devices will be described in detail below. However, the upper device 10, the lower devices 50, and the user devices 60 will be described prior to describing the OLT system 20, the splitters 30, and the ONUs 40 for the sake of convenience in explanation.

The upper device 10 is communicatively connected to a plurality of lower devices 50 via the OLT system 20, the splitters 30, and the ONUs 40. The upper device 10 is a device that realizes a predetermined function by communicating with the plurality of lower devices 50. The upper device 10 is, for example, a base station apparatus (a base band unit or BBU) on a mobile network. The upper device 10 may be, for example, communication equipment constituting a relay network.

The lower devices 50 are devices that realize predetermined functions by communicating with the upper device 10. The lower devices 50 are devices that are provided at positions closer to the users than to the upper device 10. In a case in which the upper device 10 is a BBU, for example, the lower devices 50 are radio devices (remote radio heads: RRHs) on the mobile network. In this case, the communication path between the lower device 50 and the user device 60 is an access section on the mobile network. On the other hand, in a case in which the upper device 10 is communication equipment constituting a relay network, the lower devices 50 may be devices such as a set-top box. In this case, the communication path between the lower device 50 and the user device 60 may be a network such as a home network. Each lower device 50 accommodates one or a plurality of user devices 60, for example. Further, each user device 60 may be directly connected to the ONU 40 without the lower device 50.

The user devices 60 are devices connected to the lower devices 50 via communication paths to be communicatively connected to other devices. Each of the user devices 60 is an information processing device, for example, a smartphone, a tablet, or a personal computer. The user device 60 may be, for example, a sensor for the Internet of Things (IoT). The user device 60 may be a device for business applications, for example, an automatic teller machine (ATM), a vending machine, or a point-of-sale (POS) terminal.

Figure 2:
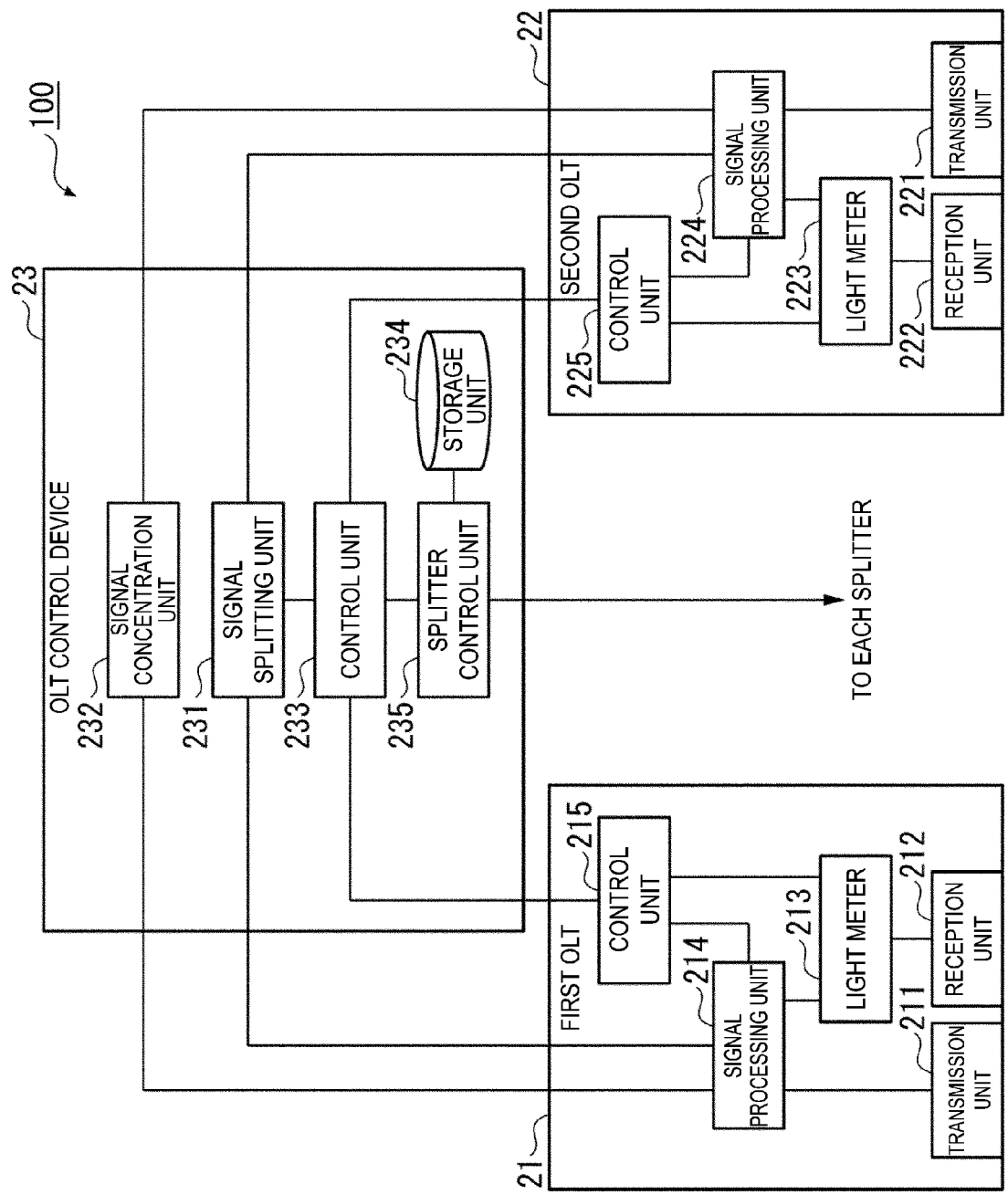
FIG. 2 is a diagram illustrating an exemplary configuration of an OLT system 20.

Next, the OLT system 20 will be described. FIG. 2 is a diagram illustrating an exemplary configuration of the OLT system 20. The OLT system 20 includes a first OLT 21, a second OLT 22, and an OLT control device 23. The first OLT 21 and the second OLT 22 are devices that each provide the OLT functions on the PON of the related art. That is, the OLT system 20 has at least two devices that provide the OLT functions. The first OLT 21 and the second OLT 22 may each be formed as a separate device having an individual housing or may be formed as a board or a chip. In any case, the first OLT 21 and the second OLT 22 are formed as software. Because the basic configurations of the first OLT 21 and the second OLT 22 are the same, the first OLT 21 will be described below as a representative.

The first OLT 21 includes a transmission unit 211, a reception unit 212, a light meter 213, a signal processing unit 214, and a control unit 215. The transmission unit 211 outputs an optical signal generated by the signal processing unit 214 to a communication path. The transmission unit 211 transmits an optical signal to the ONUs 40 via the splitters 30. Optical signals addressed to the plurality of ONUs 40 may be superimposed on the optical signal transmitted by the transmission unit 211.

The reception unit 212 receives an optical signal from a communication path and outputs the received optical signal to the light meter 213. The reception unit 212 receives optical signals from the ONUs 40 via the splitters 30. Optical signals transmitted from the plurality of ONUs 40 may be superimposed on the optical signals received by the reception unit 212.

The light meter 213 outputs information regarding the light intensity of the optical signal received by the reception unit 212. The light meter 213 may output a value representing, for example, the light intensity of the optical signal. The light meter 213 may output a binary value indicating whether the light intensity of the optical signal exceeds a predetermined threshold, for example. The light meter 213 may output any information as long as the information enables the control unit 215 to determine whether the reception unit 212 has received optical signals normally.

The signal processing unit 214 functions as an OLT of the related art. Exemplary processing of the signal processing unit 214 will be described below. The signal processing unit 214 converts an electrical signal transmitted from the upper device 10 to the lower devices 50 into an optical signal and outputs the converted signal to the transmission unit 211. The signal processing unit 214 may superimpose (multiplex) optical signals addressed to the plurality of lower devices 50. The signal processing unit 214 converts the optical signal received by the reception unit 212 into an electrical signal and outputs the electrical signal to the upper device 10 to be transmitted via the OLT control device 23.

The control unit 215 controls operations of the first OLT 21 following instructions from the OLT control device 23. When there is an instruction from a control unit 233 to perform an operation in a communication state, the control unit 215 controls the first OLT 21 such that the first OLT functions as an OLT on a normal PON. In addition, the control unit 215 outputs an output from the light meter 213 to the control unit 233. When the control unit 215 is instructed by the control unit 233 to operate in a standby state, the control unit 215 controls each of the functional units such that the first OLT 21 does not function as an OLT on the normal PON. In this case, the control unit 215 transmits the output from the light meter 213 to the control unit 233.

Some or all of operations of the control unit 215 may be implemented by software executed by, for example, a processor such as a CPU and a memory. Some or all of the control unit 215 may be implemented by hardware including an electronic circuit (or circuitry) in which, for example, a large scale integration circuit (LSI), an application specific integrated circuit (ASIC), a programmable logic device (PLD), a field programmable gate array (FPGA), or the like is used.

The transmission unit 211, the reception unit 212, the light meter 213, the signal processing unit 214, and the control unit 215 of the first OLT 21 each correspond to a transmission unit 221, a reception unit 222, a light meter 223, a signal processing unit 224, and a control unit 225 of the second OLT 22.

The OLT control device 23 includes a signal splitting unit 231, a signal concentration unit 232, the control unit 233, a storage unit 234 and a splitter control unit 235. The signal splitting unit 231 outputs a downlink signal output from the upper device 10 (a signal to be transmitted to the ONUs 40)

to at least one of the first OLT 21 or the second OLT 22 following control of the control unit 233.

The signal concentration unit 232 outputs an uplink signal output from either the first OLT 21 or the second OLT 22 (a signal received from the ONUs 40) to the upper device 10.

The control unit 233 manages information indicating the OLT assigned to each ONU 40. The control unit 233 controls operations of the signal splitting unit 231 and operations of the first OLT 21 and the second OLT 22 based on a predetermined criterion. The predetermined criterion is a criterion for maintaining communication even if an equipment failure occurs in the communication system 100. Examples of operations of the control unit 233 include a first operation example and a second operation example.

In the first operation example, the control unit 233 controls each device differently in a normal communication state and in a failed communication state. The normal communication state is a state in which no particular communication problem has been detected in the communication system 100. In this case, the control unit 233 exerts control such that one of the first OLT 21 and the second OLT 22 is in a communication state and the other is in a standby state. In the normal communication state, the control unit 233 controls the signal splitting unit 231 so as to transmit an uplink signal output from an OLT in the normal state to the upper device 10. In addition, in the normal communication state, the control unit 233 controls the signal splitting unit 231 so as to output a signal transmitted from the upper device 10 to the OLT in the normal state.

The control unit 233 receives information regarding an output of a light meter from the OLT in the standby state to detect a communication problem in the communication system 100. For example, it is determined that a communication problem has occurred when the light intensity of an optical signal received by the OLT in the standby state is lower than a predetermined threshold. In this case, the control unit 233 operates in the failed communication state. In other words, the control unit 233 shifts the OLT, which has been in the standby state, to a communication state. Thereafter, both the first OLT 21 and the second OLT 22 of the OLT system 20 function as OLTs. During the failed communication, the signal processing unit 214 transfers uplink signals output from the OLTs (both OLTs) in the normal state to the signal concentration unit 232 to transmit to the upper device 10. In addition, during the failed communication, the control unit 233 controls the signal splitting unit 231 such that a signal transmitted from the upper device 10 is output to the OLTs (both OLTs) in the normal state.

In the second operation example, the control unit 233 controls both the first OLT 21 and the second OLT 22 in the communication state, regardless of whether the communication system 100 has a failure. For this reason, the signal processing unit 214 transfers uplink signals output from the OLTs (both OLTs) in the normal state to the signal concentration unit 232 to transmit to the upper device 10. In addition, the control unit 233 controls the signal splitting unit 231 to output a signal transmitted from the upper device 10 to the OLTs (both OLTs) in the normal state. The storage unit 234 and the splitter control unit 235 will be described after the description of the splitter 30 and the ONU 40 for convenience of description.

Figure 3:
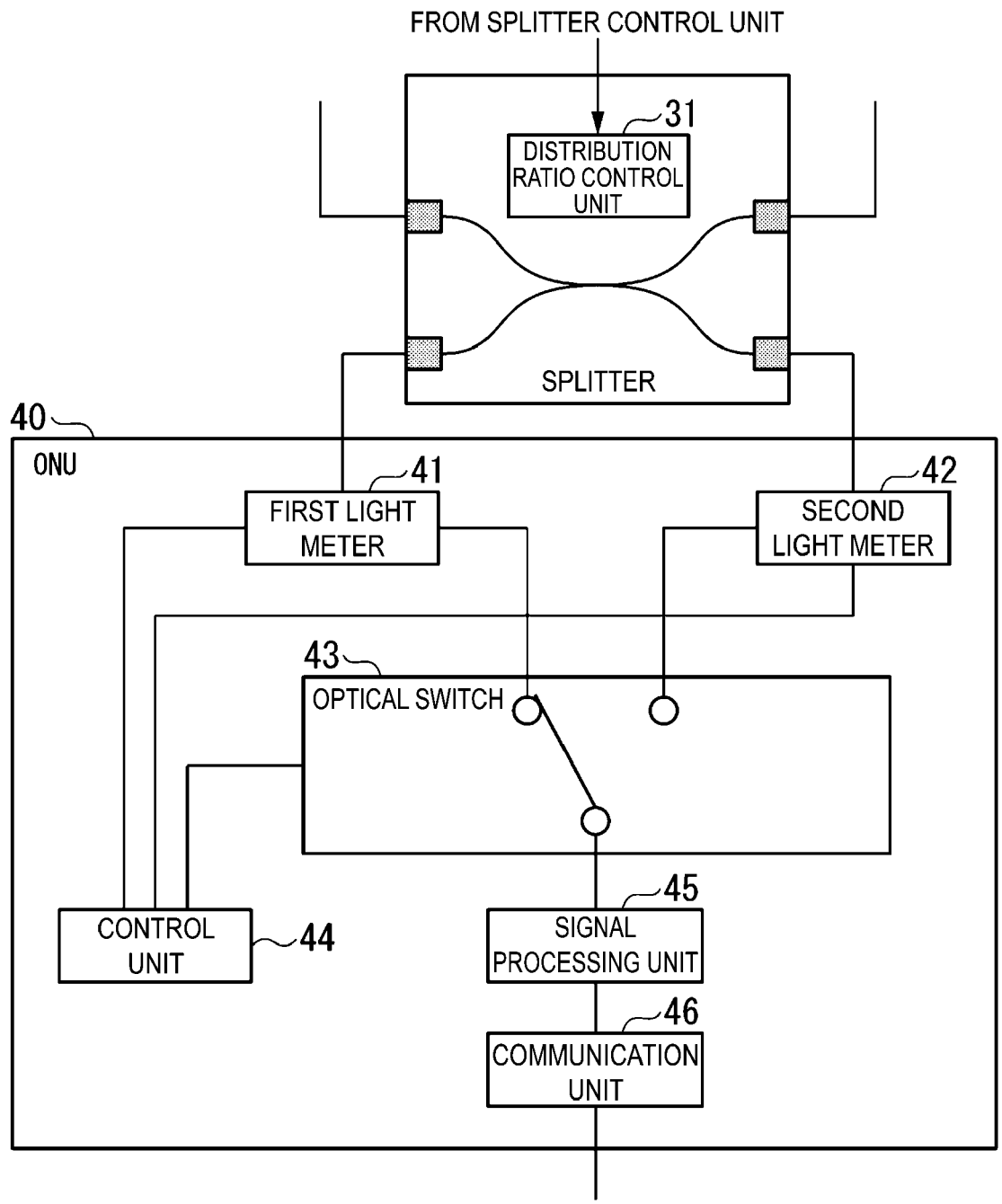
FIG. 3 is a diagram illustrating an exemplary configuration of a splitter 30 and an ONU 40.

FIG. 3 is a diagram illustrating an exemplary configuration of the splitter 30 and the ONU 40. The splitter 30 is configured with a two-input two-output splitter for optical signals. The splitter 30 includes a distribution ratio control unit 31. The splitter 30 distributes and outputs optical signals input from a communication path connecting the OLT system 20 formed in a ring shape and each splitter 30 (hereinafter referred to as a "main communication path") to a succeeding device and the ONU 40 connected to the splitter 30. A distribution ratio at this time is controlled by the distribution ratio control unit 31. The distribution ratio control unit 31 controls the distribution ratio in accordance with an instruction output from the splitter control unit 235 of the OLT control device 23. For example, when the splitter control unit 235 outputs an instruction for a distribution ratio "31:1", the ratio of the intensity of the optical signal output to the succeeding device to the optical signal output to the ONU 40 is controlled to be 31:1.

The succeeding device is a device different from a device from which the optical signal input to a reference device is output, out of two devices connected to the reference device via the main communication path. For example, if a splitter 30-1 is set as a reference splitter in FIG. 1, the succeeding device is a splitter 30-2 when an optical signal input from the OLT system 20 is distributed. For example, if a splitter 30-2 is set as a reference splitter in FIG. 1, the succeeding device is a splitter 30-3 when an optical signal input from the splitter 30-1 is distributed. For example, if a splitter 30-2 is set as a reference splitter in FIG. 1, the succeeding device is a splitter 30-1 when an optical signal input from the splitter 30-3 is distributed. Note that, the succeeding device is a device from which an optical signal input to the reference device is output, out of two devices connected to the reference device via the main communication path.

In addition, the splitter 30 outputs an optical signal to be output to the ONU 40 that is connected to the splitter 30 to the ONU 40 on a different communication path according to an input port. For example, the splitter 30 outputs the optical signal coming from the upper left of FIG. 3 to the upper right and lower right. Thus, taking the splitter 30-1 of FIG. 1 as an example, an optical signal coming from the first OLT 21 is output to a path 91-2 and the splitter 30-2. The optical signal output to the path 91-2 is input to the ONU 40-1. In addition, for example, the splitter 30 outputs an optical signal coming from the upper right of FIG. 3 to the upper left and lower left. Thus, taking the splitter 30-1 of FIG. 1 as an example, an optical signal coming from the splitter 30-2 is output to a path 91-1 and the first OLT 21. The optical signal output to the path 91-1 is input to the ONU 40-1. Further, the path 91-1 and the path 91-2 are each connected to different light meters. For example, the path 91-1 is connected to a first light meter 41 and the path 91-2 is connected to a second light meter 42.

The ONU 40 includes the first light meter 41, the second light meter 42, an optical switch 43, a control unit 44, a signal processing unit 45, and a communication unit 46. The first light meter 41 receives an optical signal output from the splitter 30. The first light meter 41 outputs information indicating the light intensity of the received optical signal to the control unit 44. The first light meter 41 outputs the received optical signal to the optical switch 43. The second light meter 42 receives an optical signal output from the splitter 30. The second light meter 42 outputs information indicating the light intensity of the received optical signal to the control unit 44. The second light meter 42 outputs the received optical signal to the optical switch 43.

The optical switch 43 outputs either an optical signal output from the first light meter 41 or an optical signal output from the second light meter 42 to the signal processing unit 45 according to control of the control unit 44. The optical switch 43 outputs an optical signal output from the signal processing unit 45 to the splitter 30 via either the first light meter 41 or the second light meter 42 according to control of the control unit 44.

The control unit 44 receives information regarding light intensity from each of the first light meter 41 and the second light meter 42, and selects the optical signal of the information from either the first light meter 41 or the second light meter 42 according to a predetermined criterion. The control unit 44 controls the optical switch 43 so that the selected optical signal is output to the signal processing unit 45. Highly reliable optical signal is selected in accordance with the predetermined criterion. The level of reliability may be determined based on the light intensity of the optical signal. For example, the control unit 44 may select an optical signal having a higher light intensity.

The control unit 44 determines the OLT to which the ONU 40 is assigned. The control unit 44 may determine, for example, the OLT (the first OLT 21 or the second OLT 22) to which the ONU 40 is assigned according to the selected light meter (the first light meter 41 or the second light meter 42). For example, when the first light meter 41 is selected, it may be determined that the ONU 40 is assigned to the first OLT 21. When the received optical signal contains transmission source information (information indicating the OLT serving as the transmission source), the control unit 44 may determine the OLT to which the ONU 40 is assigned in accordance with the transmission source information. The control unit 44 notifies the OLT system 20 of the information indicating the OLT to which the ONU 40 is assigned. Some or all of the operations of the control unit 44 may be implemented by hardware including an electronic circuit using an LSI, an ASIC, a PLD, or an FPGA, for example.

The signal processing unit 45 functions as an ONU on the PON of the related art. Hereinafter, exemplary processing of the signal processing unit 45 will be described. The signal processing unit 45 converts an optical signal indicating a signal transmitted from the upper device 10 to the lower device 50 into an electrical signal and outputs the converted signal to the communication unit 46. At this time, if optical signals addressed to a plurality of lower devices 50 are superimposed (multiplexed), an optical signal addressed to the lower device 50 connected to the ONU 40 is taken out from the optical signals and then converted into an electrical signal. The signal processing unit 45 converts an electrical signal received by the communication unit 46 into an optical signal and outputs the converted signal to the optical switch 43. The communication unit 46 is a communication interface that enables communication with the lower device 50.

Next, the storage unit 234 and the splitter control unit 235 will be described with reference to FIG. 2. The storage unit 234 is provided with a storage device such as a magnetic hard disk device or a semiconductor storage device. The storage unit 234 stores data to be used by the control unit 235 to execute control processing. For example, the storage unit 234 stores a distribution ratio table for each splitter 30 to be controlled.

FIGS. 4 and 5 are diagrams illustrating exemplary specific distribution ratio tables. The distribution ratio tables include assigned OLTs and values of distribution ratios. Each assigned OLT denotes an OLT (the first OLT 21 or the second OLT 22) that is assigned to the ONU 40 connected to the splitter 30 to be controlled. The distribution ratio indicates a distribution ratio used when the associated assigned OLT is assigned to the ONU 40. The distribution ratio indicates a ratio between the intensity of an optical signal to be distributed to the succeeding device and the intensity of an optical signal to be distributed to the ONU 40 at the splitter 30. For example, in a case in which the distribution ratio is 14:18, the ratio of the intensity of an optical signal output to the succeeding device to the intensity of an optical signal output to the ONU 40 is controlled to be 14:18.

In the following description, the ONU 40 connected to the splitter 30 for which the distribution ratio table is used is referred to as a target ONU. Contents of the distribution ratio table may be determined according to the distance between the OLT corresponding to the assigned OLT and the target ONU. The distance to the assigned OLT may be represented, for example, using a physical distance value, the number of hops (the number of splitters 30), or other values.

For example, as the distance between the assigned OLT and the target ONU increases, in the distribution ratio, the ratio of the intensity of the optical signals distributed to the succeeding device decreases, and as the distance between the assigned OLT and the target ONU decreases, in the distribution ratio, the ratio of the intensity of the optical signal distributed to the succeeding device increases. As a result of this configuration, the splitter 30 where the distance between the assigned OLT and the target ONU is short distributes a larger amount of optical signals to the succeeding device. A plurality of splitters 30 and ONUs 40 are connected to a subsequent stage of the splitter 30 where the distance between the assigned OLT and the target ONU is short, and thus the distance to each splitter 30 and ONU 40 is long. Because a larger amount of optical signals is distributed to the succeeding devices, it is possible to make the optical signals reliably reach these devices with high accuracy. An optical signal with a strong light intensity reaches the splitter 30 where the distance between the assigned OLT and the target ONU is short. As a result, even if the distribution ratio with respect to the ONU 40 is low, it is possible to bring an optical signal with a sufficient amount of light to the target ONU.

More specifically, a PON system that can split into 32 will be described as an example. Further, the attenuation of an optical signal according to a distance is not considered for the sake of simplified description. The distribution ratio 31:1 is set for a splitter 30 (a first splitter 30) that is the first splitter from an OLT. The distribution ratio 30:1 is set for the next splitter 30 (second splitter 30). The distribution ratio 29:1 is set for the next splitter 30 (third splitter 30). Then, the distribution ratio 1:1 is set for the 31st splitter 30. In other words, in this specific example, a distribution ratio (32-n):1 (n is an integer equal to or greater than 1) is set for the splitter 30 that is in the n-th order from the OLT. At the time of failure in the first operation example, the 31st splitter 30 becomes the first splitter 30 when the OLT assigned to the splitter is changed. Thus, the distribution ratio of the splitter 30 is changed from 1:1 to 31:1.

As illustrated in FIG. 4, in the distribution ratio table, the distribution ratio of the first OLT and the distribution ratio of the second OLT may be a ratio in which the value of the previous term and the value of the latter term are switched. As illustrated in FIG. 5, in the distribution ratio table, the distribution ratio of the first OLT and the distribution ratio of the second OLT may not be a ratio in which the value of the previous term and the value of the latter term are switched.

Figure 6:
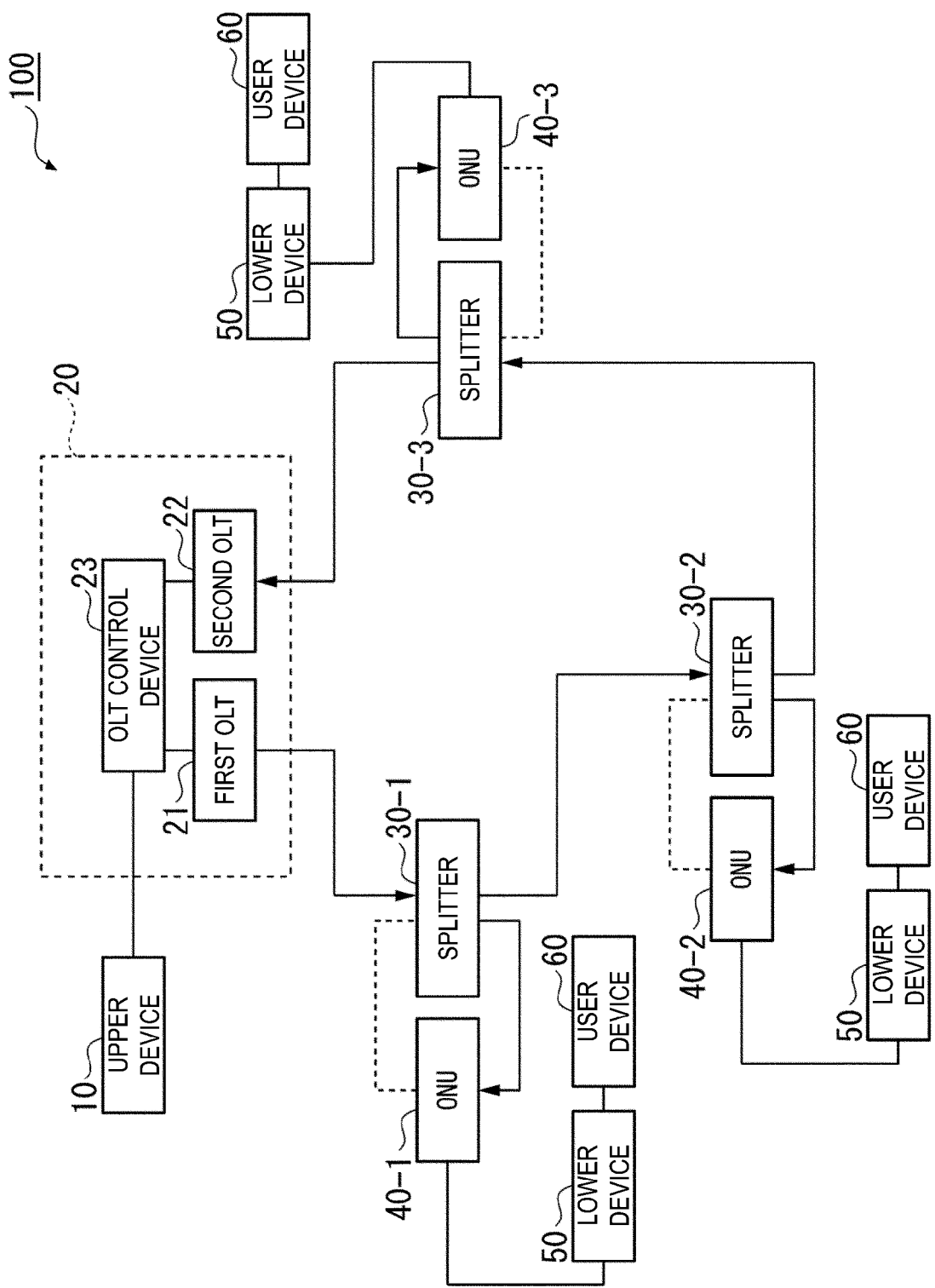
FIG. 6 is a diagram illustrating a specific exemplary operation of the communication system 100 during normal communication in a first operation example.

FIG. 6 is a diagram illustrating a specific exemplary operation of the communication system 100 during normal communication in the first operation example. The arrows shown in FIG. 6 represent the flow of a downlink signal (a signal flowing from the upper device 10 to the lower device 50). In the example of FIG. 6, the first OLT 21 is controlled to be in a communication state, and the second OLT 22 is controlled to be in a standby state. With the control, the downlink signal is transmitted in a counterclockwise direction in the communication system 100 in FIG. 6. The control is performed from when the communication system 100 is activated or when the OLT system 20 is activated. When receiving an instruction to operate in a normal state, the first OLT 21 activates equipment needed to function as an OLT, such as the signal processing unit 214, and operates as an OLT on the normal PON. The first OLT 21 is assigned to each ONU 40. Thus, the splitter control unit 235 controls the distribution ratio of each splitter as the distribution ratio when the assigned OLT is the first OLT 21.

In FIG. 6, the communication paths indicated by the dashed lines of the two communication paths extending from the splitters 30 to the ONUs 40 indicate communication paths through which no optical signals transmitted from the OLT system 20 passes. The solid-line arrows indicate communication paths through which optical signals transmitted from the OLT system 20 pass.

In the example of FIG. 6, no particular failure has occurred in the communication system 100. Thus, the second OLT 22 receives an optical signal output from the splitter 30-3. As a result, the control unit 233 of the OLT control device 23 of the OLT system 20 determines that no failure has occurred.

Figure 7:
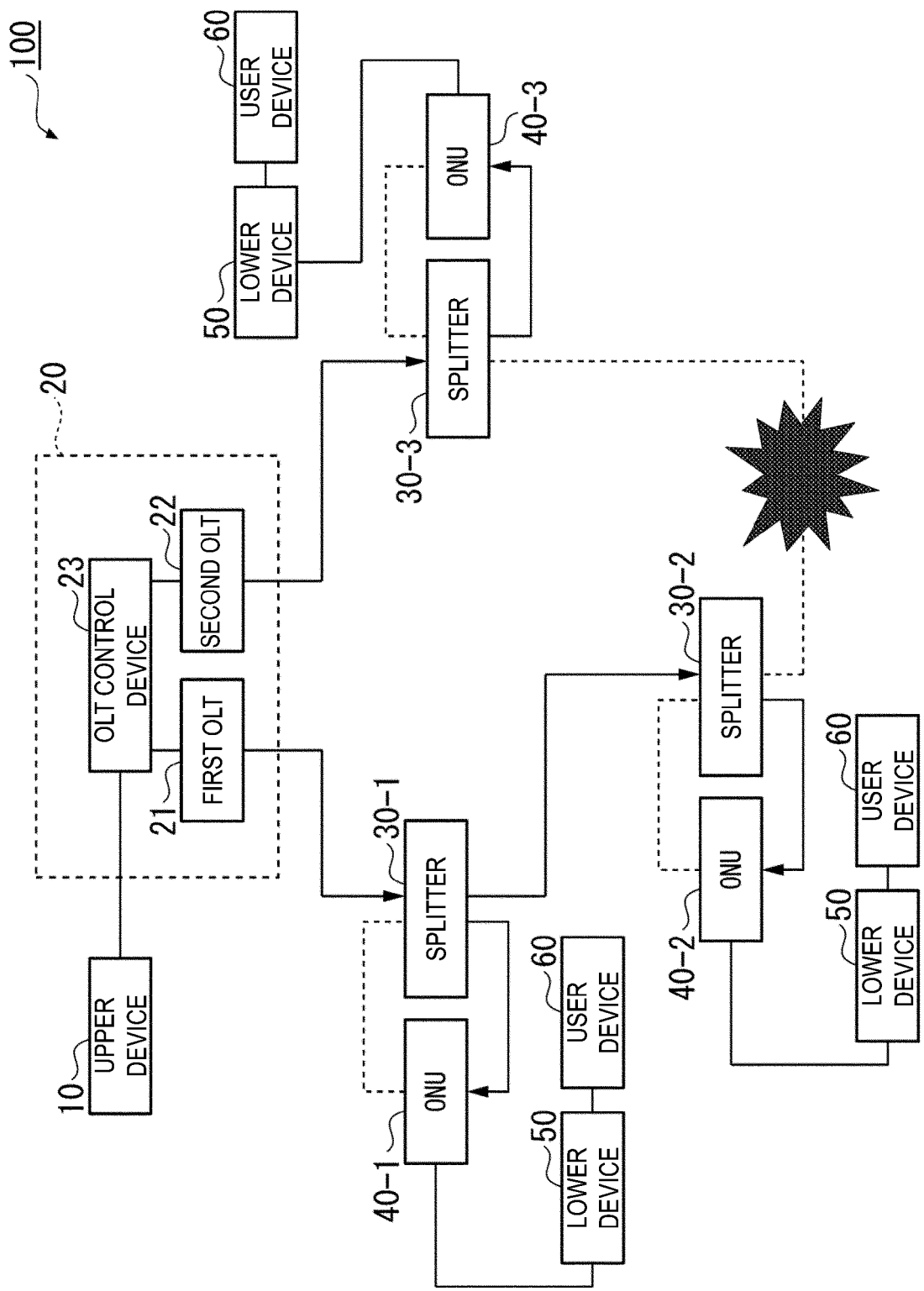
FIG. 7 is a diagram illustrating a specific exemplary operation of the communication system 100 during failed communication in the first operation example.

FIG. 7 is a diagram illustrating a specific exemplary operation of the communication system 100 during failed communication in the first operation example. The arrows shown in FIG. 7 represent the flow of a downlink signal (a signal flowing from the upper device 10 to the lower device 50). In the example of FIG. 7, the communication path between the splitter 30-2 and the splitter 30-3 has a failure. For this reason, the downlink signal output from the splitter 30-2 fails to reach the splitter 30-3. The second OLT 22 does not receive the optical signal output from the splitter 30-3. As a result, the control unit 233 of the OLT control device 23 of the OLT system 20 determines that a failure has occurred.

The control unit 233 performs control such that the second OLT 22 transitions to the normal state based on the determination. As a result, the second OLT 22 also outputs an optical signal equivalent to the optical signal output by the first OLT 21 to the communication path. Although the splitter 30-3 is not able to receive the optical signal output from the first OLT 21 due to the occurrence of the failure, the splitter can receive the optical signal output from the second OLT 22. The ONU 40-3 receives the optical signal transmitted from the second OLT 22 via the splitter 30-3. As a result, the ONU 40-3 changes the assigned OLT from the first OLT 21 to the second OLT 22. The splitter control unit 235 performs control such that the distribution ratio of the splitter 30-3 is changed to the distribution ratio when the assigned OLT is the second OLT 22.

With the operation described above, all of the ONUs (the ONU 40-1, the ONU 40-2, and the ONU 40-3) can receive the downlink signal from the OLT system 20 and maintain communication regardless of the occurrence of a failure.

Further, although the flow of the downlink signal in the first operation example has been described, an uplink signal is transmitted from each ONU 40 to the OLT system 20 when the signal flows in the opposite direction of the arrows through the paths indicated by the solid lines in each drawing.

Figure 8:
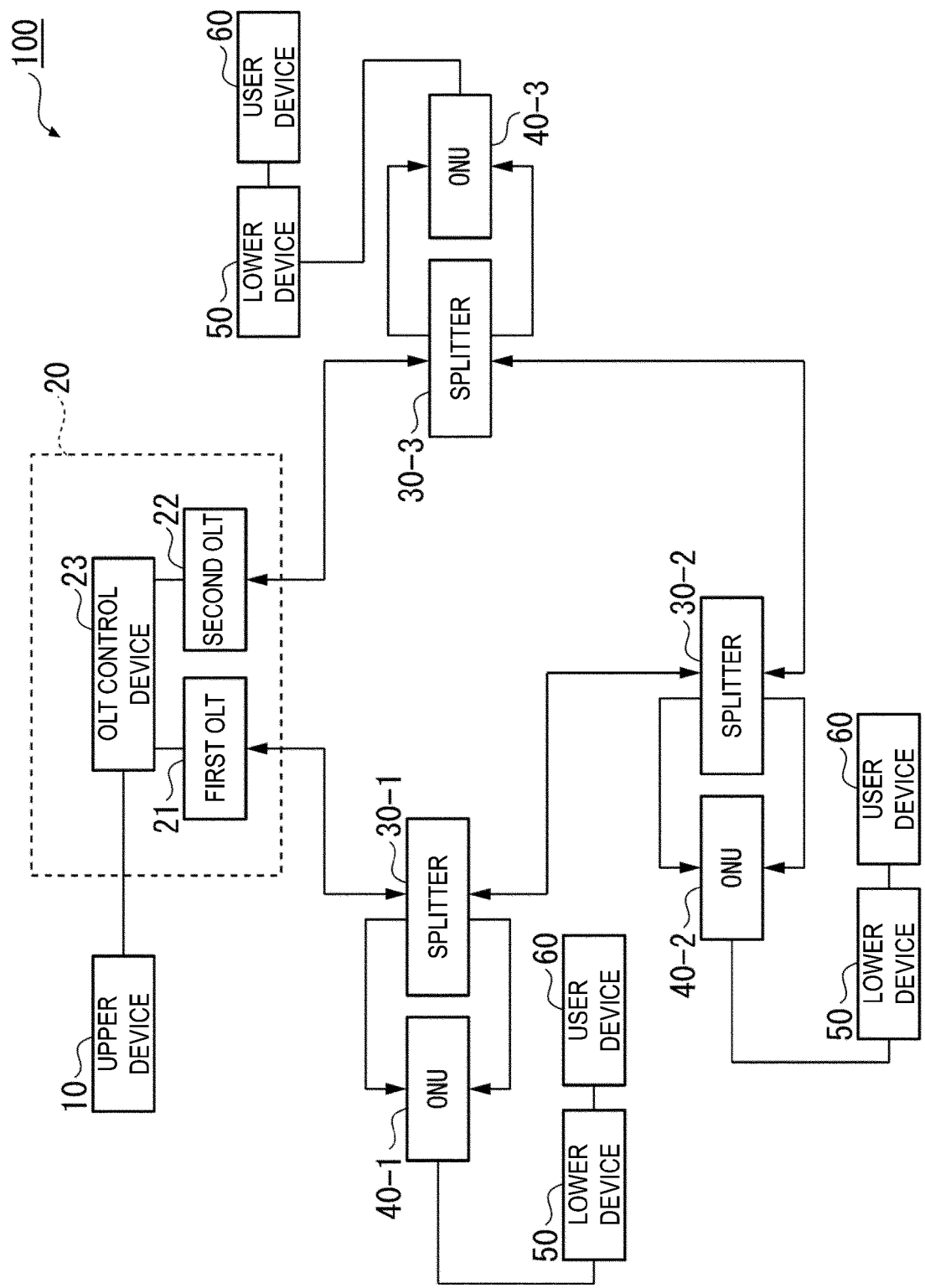
FIG. 8 is a diagram illustrating a specific exemplary operation of the communication system 100 during normal communication in a second operation example.

FIG. 8 is a diagram illustrating a specific exemplary operation of the communication system 100 during normal communication in the second operation example. The arrows shown in 6 represent the flow of a downlink signal (a signal flowing from the upper device 10 to the lower device 50). In the example of FIG. 8, both the first OLT 21 and the second OLT are controlled to be in a communication state.

With the control, the downlink signal is transmitted on both paths in the clockwise and counterclockwise directions in the communication system 100 in FIG. 8. The control is performed from when the communication system 100 is activated or when the OLT system 20 is activated. When receiving an instruction to operate in a normal state, the first OLT 21 and the second OLT 22 activate equipment needed to function as OLTs, such as the signal processing unit 214 and the signal processing unit 224, and operates as OLTs on the normal PON. Either the first OLT 21 or the second OLT 22 is assigned to each ONU 40. Each ONU 40 notifies the OLT system 20 of information indicating the OLT assigned to the ONU 40. The splitter control unit 235 exerts control such that the distribution ratio of each splitter 30 is changed to the distribution ratio in accordance with the assigned OLT of the ONU 40 connected to the splitter.

In the example of FIG. 8, optical signals are transmitted from both the first OLT 21 and the second OLT 22, and any one of the optical signals is selected and used for processing in accordance with a predetermined criterion (for example, the signal with a higher light intensity) at each ONU 40. Thus, even if a failure occurs in the middle of a path as illustrated in FIG. 7, for example, all of the ONUs (ONU 40-1, ONU 40-2, and ONU 40-3) can receive the downlink signal from the OLT system 20 and maintain communication without particularly controlling the OLT system 20 for the failure.

Further, although the flow of the downlink signals is described in the second operation example, uplink signals are also transmitted to the OLT system 20 on the same path. Further, in FIG. 8, although the arrows between the splitters 30 and the ONUs 40 are directed in one direction, this arrow indicates the direction of the downlink signal. In the case of the uplink signal, the signal is transmitted using a path selected by the optical switch 43.

In the communication system 100 configured as described above, the OLT system 20 has functions of a plurality (for example, two) of OLTs. Even if a failure occurs in a communication path or the like, the likelihood that each ONU 40 receives an optical signal from at least one OLT increases. For this reason, the likelihood that communication can be maintained even when a failure occurs in the PON can increase.

In addition, in the communication system 100 configured as described above, the distribution ratio of each splitter 30 is controlled according to the assigned OLT of the ONU 40 connected to the splitter 30. As a result, it is possible to reliably and accurately reach optical signals to ONUs 40.

Modified Example

In the OLT system 20, the OLT control device may be configured as a functional unit in a device of either or both of the first OLT 21 and the second OLT 22.

Although the embodiments of the present invention have been described in detail with reference to the drawings, a specific configuration is not limited to the embodiments, and a design or the like in a range that does not depart from the gist of the present invention is included.

INDUSTRIAL APPLICABILITY

The present disclosure can be applied to a communication system using a PON.

REFERENCE SIGNS LIST

100 Communication system
10 Upper device
20 OLT system
21 First OLT
22 Second OLT
23 OLT control device
30 Splitter
40 ONU
50 Lower device
60 User device
211 Transmission unit
212 Reception unit
213 Light meter
214 Signal processing unit
215 Control unit
221 Transmission unit
222 Reception unit
223 Light meter
224 Signal processing unit
225 Control unit
231 Signal splitting unit
232 Signal concentration unit
233 Control unit
234 Storage unit
235 Splitter control unit
41 First light meter
42 Second light meter
43 Optical switch
44 Control unit
45 Signal processing unit
46 Communication unit

The invention claimed is:

1. A communication system of a passive optical communication network, the communication system comprising:
an optical line terminal (OLT) system including a first OLT, a second OLT, and an OLT control device configured to control the first OLT and the second OLT;
a plurality of splitters each configured to connect an optical communication path, both ends of the optical communication path being connected to the first OLT and the second OLT, respectively; and
a plurality of optical network units (ONUs), each of the plurality of ONUs being connected to one of the plurality of splitters via the optical communication path,
wherein a first splitter of the plurality of splitters distributes and outputs a first optical signal transmitted from the first OLT to a first ONU of the plurality of ONUs connected to the first splitter and a first succeeding splitter of the plurality of splitters,
a second splitter of the plurality of splitters distributes and outputs a second optical signal transmitted from the second OLT to a second ONU of the plurality of ONUs connected to the second splitter and a second succeeding splitter of the plurality of splitters,
the OLT control device determines a distribution ratio at each of the first splitter and the second splitter, the OLT control device controls the distribution ratio at each of the first splitter and second splitter, the distribution ratio indicating a ratio between an intensity of one of the first and second optical signals distributed to a corresponding one of the first succeeding splitter and the second succeeding splitter and an intensity of one of the first and second optical signals distributed to a corresponding one of the first ONU and the second ONU,
during normal communication where no failure is detected in the passive optical communication network, each of the plurality of ONUs is configured to receive the first and second optical signals and select one of the first and second optical signals, and the selected one has a higher light intensity than the other of the first and second optical signals, and
during failed communication where a failure is detected in the passive optical communication network, each of the plurality of ONUs is configured to receive one of the first and second optical signals, and
wherein the OLT control device determines and controls the distribution ratio at each of the first splitter and second splitter according to the first OLT being an assigned OLT, and determines and controls the distribution ratio at each of the first splitter and second splitter according to the second OLT being the assigned OLT.

2. The communication system according to claim 1, wherein the OLT control device determines the distribution ratio at a splitter of the plurality of splitters according to one of the first and second OLTs to which an ONU of the plurality of ONUs connected to the splitter is assigned.

3. The communication system according to claim 2, wherein the OLT control device determines the distribution ratio at the splitter of the plurality of splitters according to a distance between the splitter and one of the first and second OLTs to which the ONU connected to the splitter is assigned.

4. The communication system according to claim 3, wherein the OLT control device determines the distribution ratio at the splitter of the plurality of splitters such that an optical signal with a large intensity is output to a succeeding splitter as the distance between the splitter and one of the first and second OLTs to which the ONU connected to the splitter is assigned decreases.

5. The communication system according to claim 1, wherein, during the normal communication, the first OLT and the second OLT receive the second optical signal and the first optical signal via the plurality of splitters, respectively, and
the OLT control device detects the failed communication in the passive optical communication network in accordance with receiving or non-receiving of the second optical signal and the first optical signal by the first OLT and the second OLT, respectively.

6. An optical line terminal (OLT) system of a passive optical communication network, the OLT system comprising:
a first OLT configured to output a first optical signal;
a second OLT configured to output a second optical signal; and
an OLT control device configured to control the first OLT and the second OLT,
wherein the first OLT and the second OLT are connected with a plurality of splitters and a plurality of optical network units (ONUs) via an optical communication path, and both ends of the optical communication path are connected to the first OLT and the second OLT, respectively,
a first splitter of the plurality of splitters distributes and outputs the first optical signal transmitted from the first OLT to a first ONU of the plurality of ONUs connected to the first splitter and a first succeeding splitter of the plurality of splitters, a second splitter of the plurality of splitters distributes and outputs the second optical signal transmitted from the second OLT to a second ONU of the plurality of ONUs connected to the second splitter and a second succeeding splitter of the plurality of splitters, the OLT control device determines a distribution ratio at each of the first splitter and the second splitter, the OLT control device controls the distribution ratio at each of the first splitter and second splitter, the distribution ratio indicating a ratio between an intensity of one of the first and second optical signals distributed to a corresponding one of the first succeeding splitter and the second succeeding splitter and an intensity of one of the first and second optical signals distributed to a corresponding one of the first ONU and the second ONU, during normal communication where no failure is detected in the passive optical communication network, each of the plurality of ONUs is configured to receive the first and second optical signals and select one of the first and second optical signals, and the selected one has a higher light intensity than the other of the first and second optical signals, and during failed communication where a failure is detected in the passive optical communication network, each of the plurality of ONUs is configured to receive one of the first and second optical signals, and wherein the OLT control device determines and controls the distribution ratio at each of the first splitter and second splitter according to the first OLT being an assigned OLT, and determines and controls the distribution ratio at each of the first splitter and second splitter according to the second OLT being the assigned OLT.

7. The OLT system according to claim 6, wherein the OLT control device determines the distribution ratio at a splitter of the plurality of splitters according to one of the first and second OLTs to which an ONU of the plurality of ONUs connected to the splitter is assigned.

8. The OLT system according to claim 7, wherein the OLT control device determines the distribution ratio at the splitter of the plurality of splitters according to a distance between the splitter and one of the first and second OLTs to which the ONU connected to the splitter is assigned.

9. The OLT system according to claim 8, wherein the OLT control device determines the distribution ratio at the splitter of the plurality of splitters such that an optical signal with a large intensity is output to a succeeding splitter as the distance between the splitter and one of the first and second OLTs to which the ONU connected to the splitter is assigned decreases.

10. The OLT system according to claim 6, wherein, during the normal communication, the first OLT and the second OLT receive the second optical signal and the first optical signal via the plurality of splitters, respectively, and the OLT control device detects the failed communication in the passive optical communication network in accordance with receiving or non-receiving of the second optical signal and the first optical signal by the first OLT and the second OLT, respectively.

* * * * *